Patented Aug. 22, 1944

2,356,388

UNITED STATES PATENT OFFICE 2,356,388

PLASTICIZERS FOR RUBBER

Russell T. Dean, Stamford, Conn., assignor to American Cyanamid Company, New York, N. Y., a corporation of Maine No Drawing. Application July 23, 1942,
Serial No. 452,057

8 Claims. (Cl. 260—761)

This invention relates to the treatment of rubber and, more particularly, to the production of rubber compositions of increased softness or plasticity.

It is well known that when rubber is subjected to mechanical working in the presence of oxygen, it is rendered more plastic. However, it is frequently desirable to shorten the time of milling by the use of suitable substances to accelerate this plasticization.

It is an object of the present invention to provide a process for accelerating the rate of breakdown of unvulcanized rubber and for increasing its plasticity. It is a further object of this invention to provide an unvulcanized rubber of increased plasticity. It is an additional object to provide a new class of rubber plasticizing agents.

The foregoing and other objects may be attained by subjecting unvulcanized rubber to the action of a small amount of a condensation product of formaldehyde with a cyclic secondary amine such as piperidine or morpholine, and hydrogen sulfide. These condensation products are either substituted methane thiols containing the group =N—CH$_2$—SH or substituted dimethyl sulfides containing the grouping =N—CH$_2$—(S—CH$_2$)$_n$—N where $n$ equals 1, 2 or 3. The preparation of these products has been described by Binz and Pence in the Journal of the American Chemical Society, 61, p. 3134, 1939. The cyclic secondary amines may be substituted with such groups as halogen, alkoxy and aryl.

In order to obtain the maximum gain in plasticity, the plasticizing agent is added to the rubber as early as possible in the milling operation, preferably just after preliminary milling and preferably in the absence of compounding ingredients, especially sulfur.

Generally, my compound will be used in a quantity less than 1% of the weight of the rubber, for example, about 0.375%. A larger amount of plasticizer may be added but the plasticizing action is not proportionately increased. The plasticizing agent may be used alone or in admixture with one or more similar agents in a manner which will be apparent to one skilled in the art.

The preferred temperature for the use of these plasticizing agents is from about 100° to 130° C., although any temperature above 50° C. and lower than the temperature to which rubber may be heated without detrimental effect may be used.

In order more clearly to illustrate my invention, the following example is given, parts being by weight. The softening effect of the compounds on the rubber in this example was determined in accordance with a modification of the well-known Zimmerman and Cooper method (Industrial and Engineering Chemistry, 20, p. 812, 1928). The plasticity measurements were made in a Williams plastometer at 100° C., using a 3-minute "Y" value. The lower "Y" values indicate higher plasticity or softer rubber.

Example

Four hundred and twenty parts of smoked sheet rubber were placed on 12-inch rolls, the initial temperature of the rolls being 95° C. After milling for five minutes, 20 parts of rubber ("A") were removed for purposes of the test and to the remaining 400 parts of rubber on the mill were added 1.5 parts (0.375%) of the plasticizer compound. Milling of this rubber mix was continued for an additional five minutes to give the finished batch ("B"). The following tabulation indicates the increase of plasticity on the basis of "Y" values for the several plasticizers indicated.

| Compound | "Y" values | |
|---|---|---|
| | "A" | "B" |
| Control (no plasticizer) | 0.172 | 0.161 |
| 1 piperidine methane thiol | 0.180 | 0.137 |
| N-morpholine methane thiol | 0.180 | 0.142 |
| Di(N-morpholine methyl) sulfide | 0.180 | 0.141 |
| Bis(N-morpholine methyl thio methyl) sulfide | 0.173 | 0.145 |

My invention may be applied to the preparation of rubber cements in one of several manners. A solution of rubber in a suitable solvent may be treated with one of the plasticizing agents of this invention, especially at an elevated temperature, to produce rubber cements of low viscosity. Low viscosity cements may also be advantageously prepared by dissolving in a suitable solvent, rubber which has been previously plasticized with a softening agent of this invention, as described in the example.

The preceding example is to be considered as merely illustrative of my invention, which is to be limited solely by the appended claims, construed as broadly as is permissible by the prior art.

I claim:

1. A process of increasing the plasticity of rubber which comprises milling unvulcanized rubber in the presence of a small amount of a condensation product of formaldehyde with a substance selected from the group consisting of piperidine and morpholine, and hydrogen sulfide, said product containing the grouping =N—CH₂—X, where X is a member of the class consisting of —SH and —(S—CH₂)ₙ—N= where n is a whole number less than 4 for a time sufficient to effect an increase in the plasticity of the rubber over that which it would have if subjected to the same conditions in the absence of said condensation product.

2. A process of increasing the plasticity of rubber which comprises milling unvulcanized rubber in the presence of a small amount of 1-piperidine methane thiol for a time sufficient to effect an increase in the plasticity of the rubber over that which it would have if subjected to the same conditions in the absence of said compound.

3. A process of increasing the plasticity of rubber which comprises milling unvulcanized rubber in the presence of a small amount of N-morpholine methane thiol for a time sufficient to effect an increase in the plasticity of the rubber over that which it would have if subjected to the same conditions in the absence of said compound.

4. A process of increasing the plasticity of rubber which comprises milling unvulcanized rubber in the presence of a small amount of di(N-morpholine methyl) sulfide for a time sufficient to effect an increase in the plasticity of the rubber over that which it would have if subjected to the same conditions in the absence of said compound.

5. Unvulcanized rubber of increased plasticity comprising rubber admixed with a small amount of a condensation product of formaldehyde with a substance selected from the group consisting of piperidine and morpholine, and hydrogen sulfide, said product containing the grouping $$=N-CH_2-X$$

where X is a member of the class consisting of —SH and —(S—CH₂)ₙ—N= where n is a whole number less than 4.

6. Unvulcanized rubber of increased plasticity comprising rubber admixed with a small amount of 1 piperidine methane thiol.

7. Unvulcanized rubber of increased plasticity comprising rubber admixed with a small amount of N-morpholine methane thiol.

8. Unvulcanized rubber of increased plasticity comprising rubber admixed with a small amount of di(N-morpholine methyl) sulfide.

RUSSELL T. DEAN.